United States Patent [19]

Kogan et al.

[11] 4,335,156

[45] Jun. 15, 1982

[54] EDIBLE FAT PRODUCT

[75] Inventors: Lawrence Kogan, Stamford; Turiddu A. Pelloso, Danbury, both of Conn.

[73] Assignee: Nabisco Brands, Inc., New York, N.Y.

[21] Appl. No.: 188,657

[22] Filed: Sep. 19, 1980

[51] Int. Cl.$^3$ ............................ A23D 3/02; C11C 3/10
[52] U.S. Cl. .................................... 426/603; 426/607; 260/410.7
[58] Field of Search ............... 426/601, 603, 606, 607; 260/410.7

[56] References Cited

U.S. PATENT DOCUMENTS

| | | | |
|---|---|---|---|
| 2,442,532 | 6/1948 | Eckey | 426/607 X |
| 3,232,971 | 2/1966 | Stein et al. | 426/601 X |
| 3,855,254 | 12/1974 | Haighton et al. | 426/601 X |
| 3,859,447 | 1/1975 | Sreenivasan | 426/607 X |
| 3,939,282 | 2/1976 | Carlile et al. | 426/603 |
| 4,087,564 | 5/1978 | Poot et al. | 426/607 X |

*Primary Examiner*—Robert A. Yoncoskie
*Attorney, Agent, or Firm*—Richard Kornutik

[57] ABSTRACT

Edible fat products are prepared from triglyceride oils having high levels of polyunsaturated fatty acids and low levels of saturated fatty acids. These products are useful in the preparation of both tub and stick margarines. A process is disclosed wherein a liquid triglyceride oil is interesterified to increase the quantity of solid triglycerides, the reaction mixture is then cooled to form a liquid fraction and solid fraction, removing a portion of the liquid fraction, adding additional triglyceride oil, and then continuing the interesterification under conditions of time and temperature-cycling effective to direct the interesterification toward the production of increased solid triglycerides. Preferably, oils such as corn oil, soybean oil, sunflower oil, and safflower oil can be fortified with sufficient solids, without the addition of hydrogenated hardstock, to form margarines of suitable consistency.

19 Claims, No Drawings

EDIBLE FAT PRODUCT

BACKGROUND OF THE INVENTION

The present invention relates to edible fat products suitable for preparing margarines, and more particularly to increasing the solid fat contents of triglyceride oils containing high levels of polyunsaturates and low levels of saturated fatty acids.

It has been known for some time that interesterifying triglyceride oils would enable the production of fat products having increased solid contents at low temperatures. Corn oil, sunflower oil, and safflower oil are examples of oils having high linoleic acid contents and relatively low saturated acid contents. Sunflower oil, for example, can have polyunsaturated fatty acid contents of as high as about 75% with saturated fatty acid contents as low as 7%. Similarly, corn oil can have polyunsaturates as high as 62% and saturates as low as about 12%. In U.S. Pat. No. 2,442,538, Abbott teaches that oils such as these can be employed to prepare margarines by first subjecting them to a directed interesterification process for about 5 days at a minimum temperature of about 40° F., and then partially hydrogenating them to increase the firmness of the products. Unfortunately, the partial hydrogenation of liquid oils results in a formation of trans isomers of oleic acid. Such trans-isomereric forms of fatty acid in the diet are the center of much scientific controversy and the subject of on-going research to determine what role, if any, they play in dietary health.

In U.S. Pat. No. 3,859,447, Sreenivasan discloses that triglyceride oils having high linoleic acid contents and insufficient solid triglycerides to form a plastic margarine, can be subjected to a directed interesterification process at temperatures of 0° to −15° C. using, as a catalyst, an alkali metal alkoxide along with an aprotic substance. Sreenivasan indicates that the combination catalyst allows interesterification to proceed at a higher rate such that an edible fat suitable for the preparation of a plastic margarine can be obtained in 7 days or less without the presence of any hydrogenated material. Unfortunately, this procedure is still quite lengthy and requires presence of aprotic substances, such as dimethyl sulfoxide, which are difficult to handle in a safe manner.

In an article in *Fette, Seifen, und Anstrichmittel*, Vol. 76, No. 2 (1974), at pages 79–82, Kattenberg describes a study of acceleration of controlled interesterification by periodic variation of the reaction temperature. He indicates that repeated cooling and warm-up steps during interesterification of sunflower oil at low temperatures accelerates the rate of reaction by a factor of about 3. While Kattenberg indicates that the resulting sunflower oil is suitable for the preparation of margarine, experience has shown that sunflower oils in general have saturated fatty acid contents too low to provide sufficient solid triglycerides to form a commercially acceptable margarine for home use.

In U.S. Pat. No. 3,855,254, Haighton et al describe the directed interesterification of liquid triglyceride oils. They disclose that the reaction rates can be accelerated by subjecting a mixture of glycerides alternately to a temperature of 1°–15° C. below the cloud point of a randomized mixture of the same glycerides, and to a temperature of at least the cloud point of that randomized mixture. The temperature is cycled at least three times until the cloud point of the mixture obtained is at least 5° C. above the cloud point of the randomized mixture. Again here, there is shown the preparation of a margarine product, but the dilatation values indicate that it is quite soft without the addition of any hardstock solids.

In Belgian Pat. No. 870,481, there is disclosed a process for the directed transesterification of a triglyceride oil or oil mixture to achieve higher solids contents, melting points and cloud points. The examples disclose the directed transesterification of a number of liquid triglyceride oils which are quite low in saturated fatty acid content. Where it is desired to form a margarine from these oils, the examples indicate that it may be necessary to add crystalline solid fats prior to interesterification. Example X indicates that where a corn oil with a high iodine number is employed as the triglyceride oil, 0.5% of solid fat crystals obtained from a previous directed transesterification can be employed to provide an end product which is said to be suitable as the sole margarine fat component. This procedure, however, requires the processing of an additional amount of the triglyceride oil through the entire cyclic process to obtain the added solids content necessary. This extra processing is less economical than might be desired.

SUMMARY OF INVENTION

It is an object of the present invention to provide edible fat products suitable for margarine preparation from liquid triglyceride oils which are naturally low in saturated fatty acids.

It is more specific object of the present invention to provide an edible fat product and a process for preparing it wherein the solid fat content of a normally liquid triglyceride oil is increased to a level sufficient to enable its use as the oil phase in a margarine product without the addition of any hydrogenated material.

It is yet another object of the present invention to provide a process which rapidly increases the solids content of a triglyceride oil containing a high level of polyunsaturates and a low level of saturated fatty acids without the addition of solid crystalline material obtained by hydrogenation or fractionation of an interesterified oil.

These and other objects are accomplished according to the present invention which provides a process for rapidly increasing the solids content of a triglyceride oil, an edible fat product prepared according to this process, and a margarine having an oil phase which consists essentially of the edible fat product prepared according to the process of the invention.

The process comprises: (a) subjecting a liquid triglyceride oil to interesterification at a temperature between a few degrees celsius below the initial cloud point of the oil and a few degrees celsius above that cloud point in the presence of a low-temperature-active catalyst; (b) continuing the interesterification for a period of time effective to increase the quantity of triglycerides which solidify at the initial cloud point; (c) cooling the triglyceride oil to a temperature below its initial cloud point to form a liquid fraction and a solid fraction; (d) removing a portion of the liquid fraction; (e) adding additional triglyceride oil; and (f) continuing the interesterification under conditions of time and temperature-cycling effective to direct the interesterification toward the production of increased solid triglycerides. The interesterification of steps (a) and (f) can be carried out in one or more cycles of adjusting the reaction temperature from about the cloud point to below the cloud point.

DETAILED DESCRIPTION OF THE INVENTION

The invention enables the production of edible fat products having solids contents high enough for the production of margarine products. Margarines for home use are generally sold as one of two principal types, namely, print, hard or stick margarine and soft or tub margarine. Hard or stick margarine has a firmness consistent with a penetration range of 50 to 150, being in units of 0.1 mm. The penetration values are obtained by ANSI/ASTM method D217-68. Specifically, a standard penetrometer cone, having a 2.5" diameter and a 45° angle with 47.5 grams added weight at a 5-second interval at 40° F. are employed. Soft or tub margarine would have a firmness consistent with a penetration range of 100 to 250. Lesser amounts of margarine are sold in a form so soft that it is fluid, being at least capable of being squeezed from a flexible container. The present invention can be employed to prepare this type of product, but is preferably directed to the production of margarine in both soft form which is typically packaged in plastic tubs and in the hard form which is suitable for printing into sticks or forming into pats.

The texture of the edible fat product, which forms the oil phase of the margarine, is defined at various temperatures by the solid fat index. The solid fat index (SFI) relates to the proportion of solid triglycerides in the oil as measured under specified conditions. It is calculated from dilatometer measurements as described in AOCS tentative method Cd 10-57.

The SFI values required for an oil phase to be used in a stick margarine are a minimum solids content of 12% at 50° F., a minimum solids content of 7% at 70° F. and at maximum solids content of 4%, preferably less than 3% at 92° F. Most preferably, the maximum solids content at 92° F. will be about 2%. At this specification, the margarine may be formed and wrapped satisfactorily, maintaining the stick form without substantial oil separation at room temperature and yet remains rapid melting on the tongue at about 96° F. A more preferred SFI profile will show solids contents within the following ranges:

| Temperature | Solids (%) |
|---|---|
| 50° F. | 14 to 28 |
| 70° F. | 8 to 11 |
| 92° F. | 3.5 maximum |

Desirably, the stick margarine should remain firm at ordinary room temperature up to about 80° F., and will therefore most preferably have an SFI value at this temperature within the range of from about 6 to about 10%.

The SFI solids values requires for an oil phase to be used in formulating a tub margarine are a minimum solids content of 6% at 50° F., and a minimum solids content of 3% at 70° F. and a maximum solids content of 4% at 92° F. Preferably, the SFI profile shows solids contents in the following ranges:

| Temperature | Solids (%) |
|---|---|
| 50° F. | 7 to 14 |
| 70° F. | 4 to 9 |
| 92° F. | 3.5 maximum |

The edible fat products of this invention can be in the form of the fat blend itself, or it can be blended to form margarine, low-fat spreads, and imitations or substitutes for margarine and butter. The composition of margarine is defined by governmental regulation and broadly comprises a water-in-oil emulsion containing at least 80% by weight of the oil phase. The low-fat spreads can contain the same ingredients as margarine, if desired, but have fat contents less than 80%. The form of the emulsion can be oil-in-water if desired. The margarine and butter substitutes can be of virtually any fat content and emulsion type. The following description will describe the production of a corn oil margarine, which is presently considered the best mode of the invention.

The process of the invention is applicable to increasing the solids content of virtually any triglyceride oil which is lower in solids content than would be desired. This increase is achieved without the addition of a discrete hard stock portion, but by a simple procedure which enriches the saturated fatty acids content of an interesterification reaction mixture by adding additional triglyceride oil starting material. Among the more clearly representative of the oils which can be improved according to the present invention are corn oil, cottonseed oil, hemp seed oil, linseed oil, olive oil, peanut oil, safflower oil, soybean oil, sunflower oil, sesame oil, rapeseed oil, mustard seed oil, tobacco seed, wheat germ oil, and tea seed oil. Preferably, the oil processed according to the present invention will be selected from the group consisting of corn oil, safflower oil, sunflower oil, soybean oil, cottonseed oil, rapeseed oil, peanut oil, linseed oil, wheat germ oil, and combinations of these.

The initial stage in the process according to the present invention is carried out in conventional manner. According to this process, a liquid triglyceride oil, such as corn oil, is subjected to interesterification at a temperature between a few degrees celsius below initial cloud point of the oil to a few degrees celsius above that cloud point in the presence of a suitable low-temperature-active catalyst. The initial cloud point of the corn oil will be determined for each sample in accordance with AOCS tentative method Cc 6-25. Typically, the cloud point will be within the range of from about $-1°$ to about 3° C. A preferred temperature range for the stage in the reaction will be between about $-5°$ C. and about 15° C.

The catalyst which can be employed according to this invention can be selected from any of those known to the art to be operable at the low temperatures contemplated herein. Representative of these catalysts are those employing alkali metals such as sodium or potassium and either the metallic, alcoholate, the hydroxide or other catalytically active form. Particularly identified among these are those selected from the group consisting of sodium metal, potassium metal, alloys of sodium and potassium, sodium hydroxide, potassium hydroxide, sodium methylate, sodium ethylate, potassium methylate, potassium ethylate, and combinations of these. The preferred catalysts according to the present invention are sodium metal, potassium metal and alloys of sodium and potassium metals. These catalysts are preferably prepared for use by predispersing them in a portion of the oil, subjecting the dispersion to high shear in a colloid mill, homogenizer, or similar device to obtain a relatively stable dispersion of high surface area.

The catalyst can be employed in any effective amount, but it is typically employed at a level of between about 0.1 and 1.0% based on the weight of the interesterification reaction mixture. If the catalyst is predispersed in only a portion of the oil, the concentration therein will be higher and the dispersion will be added in an amount effective to provide the desired catalyst concentration in the interesterification reaction mixture. The catalyst is activated by heating in the oil to a temperature sufficient to activate the catalyst, but not so extreme as to effect the catalyst life or result in undesireable side reactions. The activation of the catalyst can be seen by a color change, which in the exemplary situation of potassium and sodium alloys is a loss of color which occurs at about 42° C.

The use of catalysts of this type requires that the triglyceride oil be substantially free from water and free fatty acids prior to processing. The oil can be dried, for example, by heating to moderate temperatures within the range from about 100° to 140° C. under a partial vacuum. Other drying methods can also be employed. The free fatty acid content of the oil can be reduced according to techniques known to the art.

The initial interesterification reaction is allowed to proceed until there is at least some increase in the quantity of triglycerides which solidify at the initial cloud point of the triglyceride oil. Preferably, the reaction will proceed until the level of solid triglycerides at 0° C. is increased by at least 1%. According to a preferred embodiment of the invention, the initial unsaturated fatty acid content of the oil, such as corn oil, will be greater than 50%. The preferred corn oil and other oils high in polyunsaturated fatty acid content, will contain substantially no solid triglycerides at 0° C. and will be increased by at least 1% solid triglycerides at this temperature, preferably to a level of greater than 3%. While the initial interesterification procedure according to the present invention can be carried out in a single stage, extending for from about 5 minutes to about one hour or more, it is preferably performed in a number of cycles wherein the temperature is raised to a few degrees celsius above the cloud point and then cooled to a few degrees celsius below the cloud point. The reaction mixture can be held in the higher temperature for from about 10 to about 120 minutes, as desired.

After this initial period of reaction, the triglyceride oil is cooled to a temperature below its initial cloud point, preferably to a temperature of at least 5° C. below the cloud point, to form a liquid fraction and a solid fraction. The liquid fraction at this stage in the reaction has been enriched with polyunsaturated fatty acids and reduced in saturated fatty acid content. It has been discovered according to the present invention that by removing a portion of this liquid fraction and replacing at least some of it with fresh feed stock, it is possible to increase the overall rate of interesterification and to achieve a final product with a higher solids content than would otherwise be possible unless crystalline solids were added.

A portion of the liquid fraction is removed from the reaction mixture and employed for other economically attractive uses, such as in liquid salad oils of enhanced ratio of polyunsaturates to saturates, and the like. The amount of liquid fraction removed, will depend upon a number of factors, including the initial concentration of saturated fatty acids and the final quantity of solid triglycerides desired in the ultimate product. Preferably, the amount of liquid fraction removed will be from about 10 to about 50% of the weight of the triglyceride oil initially added.

The additional triglyceride oil, which is added after the removal of the portion of the liquid fraction, supplies additional saturated fatty acids which during subsequent processing increase the rate of reaction and provide a higher total solids content in the final product. The amount of additional triglyceride oil added will be determined based upon a number of considerations, including the desired SFI profile for the fat, the desired degree of polyunsaturates, and the economics of the reaction. Typically, the additional triglyceride oil will be added in an amount about equal to the amount of the liquid fraction removed. It is preferable to include active catalyst in the additional triglyceride oil. In this manner, the catalyst concentration can be maintained at the high effective level employed in the initial interesterification procedure, or it can be increased as may be desired for the subsequent interesterification procedure to follow which is conducted at lower temperatures.

The interesterification reaction is continued after addition of the additional fresh triglyceride oil feed stock, but is conducted under conditions of time and temperature cycling which are effective to direct the interesterification towards the production of increased solid triglycerides. Because the art is aware that the technique of cycling the reaction temperature between a temperature above the cloud point of the mixtures to a temperature below the cloud point of the mixture provides a more rapid process, this type of procedure is employed according to the present invention. Representative of directed processes which employ this cycling technique are those described in U.S. Pat. No. 3,855,254 and Belgian Pat. No. 870,481. The disclosures of these references are hereby incorporated by reference in their entireties to show the detail of suitable procedures for directing the interesterification reaction toward the production of increased solid triglycerides. Where desired, a portion of the liquid fraction can be removed at the end of any one or more of the cycles and fresh feed triglyceride oil added. In this manner, the level of saturated fatty acids can be maintained at a high level to maintain a high reaction rate.

To prepare a margarine, separate oil and water phases are prepared and then blended and emulsified together. The oil phase will contain, in addition to edible fat prepared as described above, all other fat soluble components such as color, flavor and vitamins, emulsifiers, and anti-spatter or crystal modifying agents. Typical emulsifiers will be mono- and di-glycerides and/or lecithin. Lecithin is also a typical anti-spattering additive, and examples of coloring agents are beta-carotene, annatto, turmeric, paprika and FD&C dyes. Representative of the flavors will be lipolyzed butter oils, diacetyl, 2-octanone, butyric acid, hexanoic acid, and the like. The water phase may contain water soluble flavors, and other water soluble and dispersible materials such as milk solids, whey solids, preservatives, salt, casein, caseinates, albumin and other suitable margarine ingredients.

The oil phase is maintained at a temperature effective to maintain all of the components of it in a liquid state prior to blending with water which is typically at a temperature effective to bring the combined mixture to a level suitable for emulsification. The emulsion may be formed in conventional in-line or tank-type emulsifiers as known to the art. After emulsification, the emulsion is pumped through a series of cooling, scraped-surface heat exchangers to promote proper crystallization during cooling. A resting or working "B" unit is typically employed before the last heat exchanger to promote crystallization. For each 80 parts by weight of oil phase, between 5 and 20 parts by weight of aqueous phase will be employed.

The following example is presented for the purpose of further illustrating and explaining the present invention and are not to be taken as limiting in any regard. Unless otherwise indicated, all parts and percentages are by weight.

Example

According to this example, a tub-type corn oil margarine with a high linoleic acid content is prepared. The corn oil shows the following analysis by gas chromatography:

| Fatty Acid | Area % |
| --- | --- |
| Palmitic acid | 10.9 |
| Stearic acid | 1.9 |
| Oleic acid | 24.5 |
| Linoleic acid | 60.3 |
| Linolenic and other acids | 2.4 |

The corn oil is dried and is then interesterified at 15° C. under a vacuum of 5 mm of mercury using 0.2% sodium-potassium alloy (50:50) as a catalyst. The catalyst is previously activated in dispersed form in a portion of the oil. The reaction mixture is maintained under an inert atmosphere and stirred while heating for 30 minutes. The interesterified corn oil is then cooled to −5° C. to produce a liquid fraction and a solid fraction. This is repeated three times. Of the liquid fraction, 25% is removed and replaced with fresh corn oil which has been dried and deacidified, and which contains 0.2% of its weight of the same active catalyst dispersed therein.

The temperature of the resulting reaction mixture is then rapidly cooled in a Votator scraped-surface exchanger to a temperature of about 15° C. where the interesterification reaction is allowed to proceed for a period of about one hour. After this initial reaction period, the temperature is decreased as rapidly as possible to about −3° C. to permit crystallization of solid triglycerides. A Votator scraped-surface heat exchanger is employed in this cooling procedure also. This reaction cycle is then completed by again raising the temperature to about 15° C. The reaction is then continued for a series of five additional reaction cycles. The catalyst is then inactivated by adding water and the interesterified corn oil is then washed, bleached, dried, and filtered. This resulting edible fat product is then deodorized and employed to prepare an oil phase of the margarine. The oil phase of the margarine consists essentially of this edible fat, but also includes the following:

| Ingredient | Weight % of Oil Phase |
| --- | --- |
| Emulsifier, mono- and di-glycerides (40% mono-) | 0.25 |
| Lecithin | 0.21 |
| Beta-carotene, vitamins, minerals & colors | 0.01 |

An aqueous phase is prepared from the following ingredients:

| Ingredient | Weight % of Aqueous Phase |
| --- | --- |
| Sodium Chloride | 10 |
| Whey Solids | 8 |
| Sodium Benzoate | 0.5 |

The oil phase is blended uniformly at a temperature of about 125° F., while the aqueous phase is blended at room temperature. The aqueous phase is then pasteurized and cooled to 50° F. The margarine composition is prepared by blending 80 parts by weight of the oil phase with 20 parts by weight of the aqueous phase, and then emulsified at 120° F. The emulsion is then passed through two cooling votator scraped-surface heat exchangers ("A" units) to an in-line mixer (working "B" unit), and then to a third "A" unit. The resulting emulsion is then pumped to the filling apparatus.

The above description is for the purpose of teaching the person skilled in the art how to practice the present invention. This description is not intended to detail all of obvious modifications and variations of the invention which will become apparent upon reading. However, applicants do intend to include all such obvious modifications and variations within the scope of their invention which is defined by the following claims.

What is claimed is:

1. A process for rapidly increasing the solids content in a triglyceride oil which comprises: (a) subjecting a liquid triglyceride oil to interesterification at a temperature between a few degrees celsius below the initial cloud point of the oil and a few degrees celsius above that cloud point in the presence of a catalyst active at the temperatures involved; (b) continuing the interesterification for a period of time effective to increase by at least 1% the quantity of triglycerides which solidify at the initial cloud point; (c) cooling the triglyceride oil to a temperature below its initial cloud point to form a liquid fraction and a solid fraction; (d) removing a portion of the liquid fraction, (e) adding additional triglyceride oil; and (f) continuing the interesterification under conditions of time and temperature-cycling effective to direct the interesterification toward the production of increased solid triglycerides.

2. A process according to claim 1 wherein the initial content of solid triglycerides is substantially zero at 0° C. and is increased by the process to a level greater than 3%.

3. A process according to claim 1 wherein the liquid triglyceride oil is selected from the group consisting of corn oil, safflower oil, sunflower oil, soybean oil, cottonseed oil, rapeseed oil, peanut oil, linseed oil, wheat germ oil, and combinations of these.

4. A process according to claim 1 wherein the initial unsaturated fatty acid content is greater than 50%.

5. A process according to claim 1 wherein the temperature for the interesterification is between about −5° and 15° C.

6. A process according to claim 1 wherein the catalyst comprises a member selected from the group consisting of sodium, potassium, alloys of sodium and potassium, sodium hydroxide, potassium hydroxide, sodium methylate, sodium ethylate, potassium methylate, potassium ethylate, and combinations of these.

7. A process according to claim 1 wherein the catalyst is present during the interesterification at a level of from 0.1 to about 1.0 percent, based on the weight of the triglyceride oil.

8. A process according to claim 1 wherein additional, active catalyst is added with the additional triglyceride oil.

9. A process according to claim 1 wherein the portion of liquid fraction removed comprises from 10 to 50% of the weight of the triglyceride oil initially added.

10. A process according to claim 1 wherein the quantity of additional triglyceride oil added is about equal to the weight of liquid fraction removed.

11. An edible fat product prepared according to the procedure of claim 1.

12. A margarine comprising a continuous oil phase which consists essentially of 80 parts by weight of the edible fat product of claim 11, and up to 20 parts by weight of a discontinuous aqueous phase.

13. A margarine according to claim 12 which exhibits a penetrometer reading of from 100 to 250.

14. A margarine according to claim 13 wherein the oil phase exhibits an SFI profile within the following ranges:

| | |
|---|---|
| 50° F. | > 6% |
| 70° F. | > 3% |
| 92° F. | < 4% |

15. A margarine according to claim 14 wherein the SFI profile is within the following ranges:

| | |
|---|---|
| 50° F. | 7 to 14 |
| 70° F. | 4 to 9 |
| 92° F. | 3.5 maximum |

16. A margarine according to claim 12 which exhibits a penetrometer reading of from 50 to 150.

17. A margarine according to claim 16 wherein the oil phase exhibits an SFI profile within the following ranges:

| | |
|---|---|
| 50° F. | >12% |
| 70° F. | >7% |
| 92° F. | <4% |

18. A margarine according to claim 17 wherein the SFI profile is within the following ranges:

| | |
|---|---|
| 50° F. | 14 to 28 |
| 70° F. | 8 to 11 |
| 92° F. | 3.5 maximum |

19. A margarine according to claim 18 wherein the SFI value at 80° F. is within the range of from about 6 to about 10%.

* * * * *